(12) United States Patent
Kuo et al.

(10) Patent No.: US 10,446,100 B2
(45) Date of Patent: Oct. 15, 2019

(54) ARRAY SUBSTRATE, LIQUID CRYSTAL DISPLAY AND DISPLAY DEVICE

(71) Applicant: Shenzhen China Star Optoelectronics Technology Co., Ltd., Shenzhen, Guangdong (CN)

(72) Inventors: Ping-sheng Kuo, Guangdong (CN); Yu-yeh Chen, Guangdong (CN); Li-wei Chu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 221 days.

(21) Appl. No.: 15/535,403

(22) PCT Filed: Dec. 22, 2016

(86) PCT No.: PCT/CN2016/111464
§ 371 (c)(1),
(2) Date: Jun. 12, 2017

(87) PCT Pub. No.: WO2018/072310
PCT Pub. Date: Apr. 26, 2018

(65) Prior Publication Data
US 2018/0374441 A1 Dec. 27, 2018

(30) Foreign Application Priority Data
Oct. 20, 2016 (CN) .......................... 2016 1 0919363

(51) Int. Cl.
G09G 3/36 (2006.01)
G02F 1/1362 (2006.01)
G02F 1/133 (2006.01)

(52) U.S. Cl.
CPC ......... G09G 3/3677 (2013.01); G02F 1/1362 (2013.01); G02F 1/13306 (2013.01);
(Continued)

(58) Field of Classification Search
CPC .............. G02F 1/13306; G02F 1/1362; G09G 2310/0213; G09G 2310/0264;
(Continued)

(56) References Cited

U.S. PATENT DOCUMENTS 8,994,414 B2 * 3/2015 Sugahara ............. H03K 17/168
326/83
2006/0284815 A1 * 12/2006 Kwon .................. G09G 3/3614
345/98
(Continued)

FOREIGN PATENT DOCUMENTS

CN 102237050 A 11/2011
CN 104835473 A 8/2015
(Continued)

*Primary Examiner* — Afroza Chowdhury
(74) *Attorney, Agent, or Firm* — Andrew C. Cheng

(57) ABSTRACT

Provided is an array substrate, including a sequence controller and gate drivers, and each of the gate drivers includes a first adjustable resistor and a gate drive unit, and one end of the first adjustable resistor is coupled to a first voltage, and the other end of the first adjustable resistor is coupled to a first input end of the gate drive unit, and the sequence controller is coupled to a control end of the first adjustable resistor to adjust a resistance value of the first adjustable resistor to make voltage difference values among the gate drive units in a preset range. In the gate driver, a first adjustable resistor is added between the first voltage and the gate drive unit. By controlling the resistance value of the first adjustable resistor, the voltages of the adjacent gate drivers are the same to prevent the appearance of the horizontal boundary.

20 Claims, 4 Drawing Sheets

(52) U.S. Cl.
CPC ... *G09G 3/3674* (2013.01); *G09G 2310/0213* (2013.01); *G09G 2310/0264* (2013.01); *G09G 2320/0223* (2013.01); *G09G 2320/0233* (2013.01); *G09G 2320/06* (2013.01)

(58) Field of Classification Search
CPC .... G09G 2320/06; G09G 3/36; G09G 3/3674; G09G 3/3677
See application file for complete search history.

(56) References Cited

U.S. PATENT DOCUMENTS

| | | | |
|---|---|---|---|
| 2015/0002208 A1 | 1/2015 | Sugahara | |
| 2016/0179275 A1* | 6/2016 | Lee | G06F 3/0416 345/174 |
| 2017/0116944 A1* | 4/2017 | Huang | G09G 3/3677 |

FOREIGN PATENT DOCUMENTS

| | | |
|---|---|---|
| CN | 105304046 A1 | 2/2016 |
| EP | 2993785 A | 3/2016 |

* cited by examiner

ARRAY SUBSTRATE, LIQUID CRYSTAL DISPLAY AND DISPLAY DEVICE

CROSS REFERENCE

This application claims the priority of Chinese Patent Application No. 201610919363.4, entitled "Array substrate, liquid crystal display and display device", filed on Oct. 20, 2016, the disclosure of which is incorporated herein by reference in its entirety.

FIELD OF THE INVENTION

The present invention relates to a liquid crystal display technology, and more particularly to an array substrate, a liquid crystal display and a display device.

BACKGROUND OF THE INVENTION

The Thin Film Transistor Liquid Crystal Display (TFT-LCD) occupies most of the market shares in the small and medium size filed with the low cost, high yield and the fine display result.

In prior art, the liquid crystal display comprises a liquid crystal panel with a plurality of gate drivers at one side. The plurality of gate drivers are coupled in series with the wires, and coupled to the printed circuit board through the connection circuit. The printed circuit board can provides a control signal for the plurality of gate drivers, and thus to make the plurality of gate drivers drive the liquid crystal panel to show an image.

In prior art, the plurality of gate drivers on the array substrate are coupled in series. With the function of the division voltage of the wires and the output currents of the gate drivers, the voltage drops generate among the wires of the adjacent gate drivers to result in that the voltage of the gate driver which is closer to the printed circuit board is larger. With the trend of large size and high resolution for the liquid crystal display, the amount of the gate drivers and the output current of the single gate driver also increase along with. The voltage drops generating among wires of the adjacent gate drivers increase in advance. Such voltage drops will result in the appearance of the horizontal boundary to cause the distortion of the image, which gets more obvious as showing the low gray scale image and seriously influence the display result.

SUMMARY OF THE INVENTION

An objective of the present invention is to provide an array substrate, in which input voltage of a plurality of gate drivers on the array substrate are the same to prevent the image distortion and badness generated due to the different input voltages of the gate drivers.

Another objective of the present invention is to provide a liquid crystal display utilizing the aforesaid array substrate.

Another objective of the present invention is to provide a display device utilizing the aforesaid liquid crystal display.

For realizing the aforesaid objective, the technical solution provided by the embodiments of the present invention is:

The gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

The first voltage is a negative voltage, and the second voltage is a positive voltage, and an absolute value of the second voltage is larger than an absolute value of the first voltage.

The first voltage is a negative voltage.

The first voltage is a positive voltage.

The sequence controller controls the resistance value of the first adjustable resistor in each of the gate drivers to be different, and the resistance value of the first adjustable resistor decreases along a potential drop direction of the first voltage.

The liquid crystal display further comprises a print circuit board, which is employed to output the first voltage to the plurality of gate drivers.

The gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

The first voltage is a negative voltage, and the second voltage is a positive voltage, and an absolute value of the second voltage is larger than an absolute value of the first voltage.

The first voltage is a negative voltage.

The first voltage is a positive voltage.

The sequence controller controls the resistance value of the first adjustable resistor in each of the gate drivers to be different, and the resistance value of the first adjustable resistor decreases along a potential drop direction of the first voltage.

The present invention provides a display device, wherein the display device comprises a liquid crystal display, and the liquid crystal display comprises a liquid crystal panel and an array substrate, and the array substrate comprises a sequence controller and a plurality of gate drivers, and each of the gate drivers comprises a first adjustable resistor and a gate drive unit, and one end of the first adjustable resistor is coupled to a first voltage, and the other end of the first adjustable resistor is coupled to a first input end of the gate drive unit, and the sequence controller is coupled to a control end of the first adjustable resistor to adjust a resistance value of the first adjustable resistor to make voltage difference values among the plurality of gate drive units in a preset range, and the gate drive units are coupled to the liquid crystal panel to drive the liquid crystal panel to show an image.

The liquid crystal display further comprises a print circuit board, which is employed to output the first voltage to the plurality of gate drivers.

The gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

The first voltage is a negative voltage, and the second voltage is a positive voltage, and an absolute value of the second voltage is larger than an absolute value of the first voltage.

The first voltage is a negative voltage.

The first voltage is a positive voltage.

The sequence controller controls the resistance value of the first adjustable resistor in each of the gate drivers to be different, and the resistance value of the first adjustable resistor decreases along a potential drop direction of the first voltage.

The embodiments of the present invention have advantages or benefits:

In the gate driver of the present invention, a first adjustable resistor is added between the first voltage and the gate drive unit. By controlling the resistance value of the first adjustable resistor with the sequence controller, the voltages of the adjacent gate drivers are the same to prevent the appearance of the horizontal boundary for improving the defects of the nonuniform brightness, the image distortion and promoting the display result. The liquid crystal display and the display device of the present invention can prevent the defects of the nonuniform brightness, the image distortion caused by the different voltages loaded to the different gate drive units.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
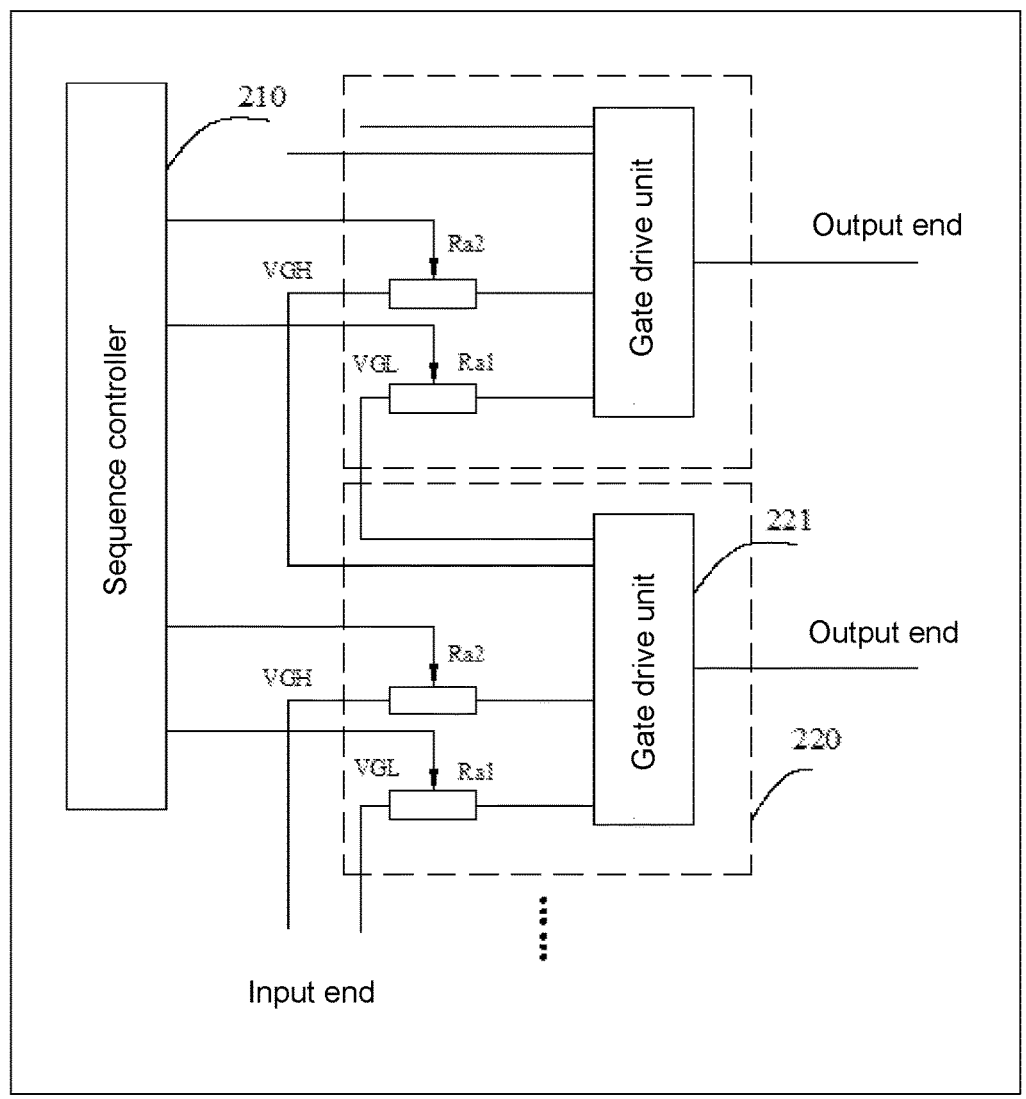
FIG. 1 is a structure diagram of an array substrate according to one embodiment of the present invention.

Please refer to FIG. 1. FIG. 1 is a structure diagram of an array substrate according to one embodiment of the present invention. The array substrate 200 comprises a sequence controller 210 and a plurality of gate drivers 220, and each of the gate drivers 220 comprises a first adjustable resistor Ra1 and a gate drive unit 221, and one end of the first adjustable resistor Ra1 is coupled to a first voltage, and the other end of the first adjustable resistor Ra1 is coupled to a first input end of the gate drive unit 221. The first voltage is outputted to the gate drive unit 221 through the first adjustable resistor Ra1, and the gate drive unit 221 is also employed to receive the second voltage. The first voltage is a low level voltage VGL, and the second voltage is a high voltage level VGH. In other words, the first voltage is a negative voltage, and the second voltage is a positive voltage. The sequence controller 210 is coupled to a control end of the first adjustable resistor Ra1 to adjust a resistance value of the first adjustable resistor Ra1. Thus, changing the voltages loaded to the gate drivers 220 makes voltage difference values among the plurality of gate drive units in a preset range.

It can be understood that the preset range can be set in advance, such as can be set to be 0V, 0.3V, 0.4V, 1V . . . .

It can be understood that polarities of the first voltage and the second voltage are opposite, and the two cannot be inputted to the gate driver 220 at the same time. As the gate driver 220 receives the high voltage level VGH outputted by the sequence controller 210, the gate drive unit 221 correspondingly outputs a high level gate drive signal to connect a thin film transistor coupled thereto for charging the thin film transistor. As the gate driver 220 receives the low voltage level VGL outputted by the sequence controller 210, the gate drive unit 221 correspondingly outputs a low level gate drive signal to disconnect the thin film transistor coupled thereto. Generally, it should be ensured that |high voltage level VGH|>|low voltage level VGL|. Namely: an absolute value of the second voltage is larger than an absolute value of the first voltage.

Specifically, the first power source signal and the second power source signal are provided by a print circuit board. The print circuit board outputs the first voltage and the second voltage to each of the gate drivers 220. It can be understood that in the plurality of gate drivers 220, the distance away from the print circuit board is longer, the length of wire is longer, and the resistance is larger and the voltage obtained by the gate driver 220 is smaller. Therefore, the sequence controller 210 controls the first adjustable resistors Ra1 in the respective gate drivers 220 so that the resistance value of the first adjustable resistors Ra1 in the gate driver 220 farer away from print circuit board is smaller, and the resistance value of the first adjustable resistors Ra1 in the gate driver 220 closer to print circuit board is larger. In another word, the sequence controller 210 controls the resistance values of the first adjustable resistors Ra1 in the respective gate drivers 220 to be different, and the resistance value of the first adjustable resistor Ra1 decreases along a potential drop direction of the first voltage.

In this embodiment, in the gate driver, the low voltage level VGL is outputted to the gate drive unit through the first adjustable resistor. The sequence controller controls the resistance value of the first adjustable resistor so that the voltages of the adjacent gate drivers are the same to prevent the appearance of the horizontal boundary for improving the defects of the nonuniform brightness, the image distortion and promoting the display result.

Selectably, the array substrate 200 further comprises a second adjustable resistor Ra2, and one end of the second adjustable resistor Ra2 is coupled to the second voltage, and the other end of the second adjustable resistor Ra2 is coupled to the second input end. The second voltage is outputted to the gate drive unit 221 through the second adjustable resistor Ra2. The sequence controller 210 is coupled to a control end of the second adjustable resistor Ra2 to adjust a resistance value of the second adjustable resistor Ra2. The sequence controller 210 achieves the objective of adjusting the voltage loaded to the gate driver 220 by controlling the resistance value of the second adjustable resistor Ra2. The second adjustable resistor Ra2 can assists the first adjustable resistor Ra1 for performing the voltage adjustment.

It can be understood that the sequence controller 210 controls the resistance values of the first adjustable resistors Ra1 and/or the second adjustable resistor Ra2 in the respective gate drivers 220 to be different. The specific resistance values can be determined in the adjustment process, and then stored in the storage unit. After the sequence controller 210 reads the adjustment data in the storage unit, the resistance values of the first adjustable resistors Ra1 and/or the second adjustable resistor Ra2 in each of the gate driver 220 are adjusted correspondingly.

Figure 2:
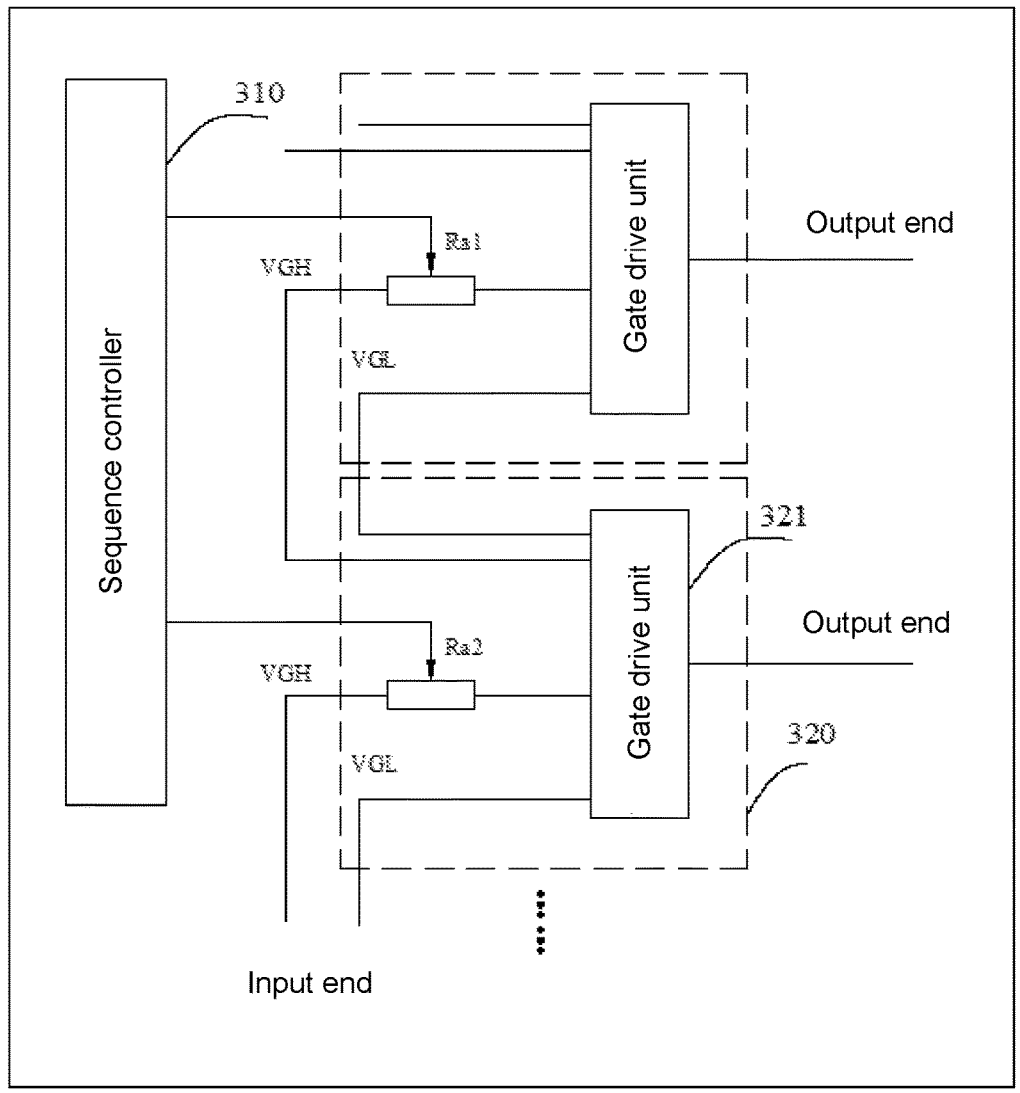
FIG. 2 is a structure diagram of an array substrate according to another embodiment of the present invention.

Please refer to FIG. 2. FIG. 2 is a structure diagram of an array substrate according to another embodiment of the present invention. The array substrate 300 comprises a sequence controller 310 and a plurality of gate drivers 320, and each of the gate drivers 320 comprises a first adjustable resistor Ra1 and a gate drive unit 321, and the first adjustable resistor Ra1 is employed to receive a first voltage, and the first voltage is outputted to the gate drive unit 321 through the first adjustable resistor Ra1, and the gate drive unit 321 is also employed to receive a second voltage. The first voltage is a high voltage level VGH, and the second voltage is a low level voltage VGL. In other words, the first voltage is a positive voltage, and the second voltage is a negative voltage. The sequence controller 310 is coupled to a control end of the first adjustable resistor Ra1 to adjust a resistance value of the first adjustable resistor Ra1. Thus, changing the voltages loaded to the gate drivers 320 makes voltage difference values among the plurality of gate drive units in a preset range. Generally, it should be ensured that |high voltage level VGH|>|low voltage level VGL|. Namely: an absolute value of the first voltage is larger than an absolute value of the second voltage.

In this embodiment, in the gate driver, the high voltage level VGH is outputted to the gate drive unit through the first adjustable resistor. The sequence controller controls the resistance value of the first adjustable resistor so that the voltages of the adjacent gate drivers are the same to prevent the appearance of the horizontal boundary for improving the defects of the nonuniform brightness, the image distortion and promoting the display result.

In the array substrate of the present invention, the sequence controller controls the resistance value of the first adjustable resistor in the gate driver so that the voltages loaded to the plurality of gate drivers are roughly the same to prevent the defects of the nonuniform brightness, the image distortion caused by the different voltages loaded to the different gate drive units and to promote the display result.

Figure 3:
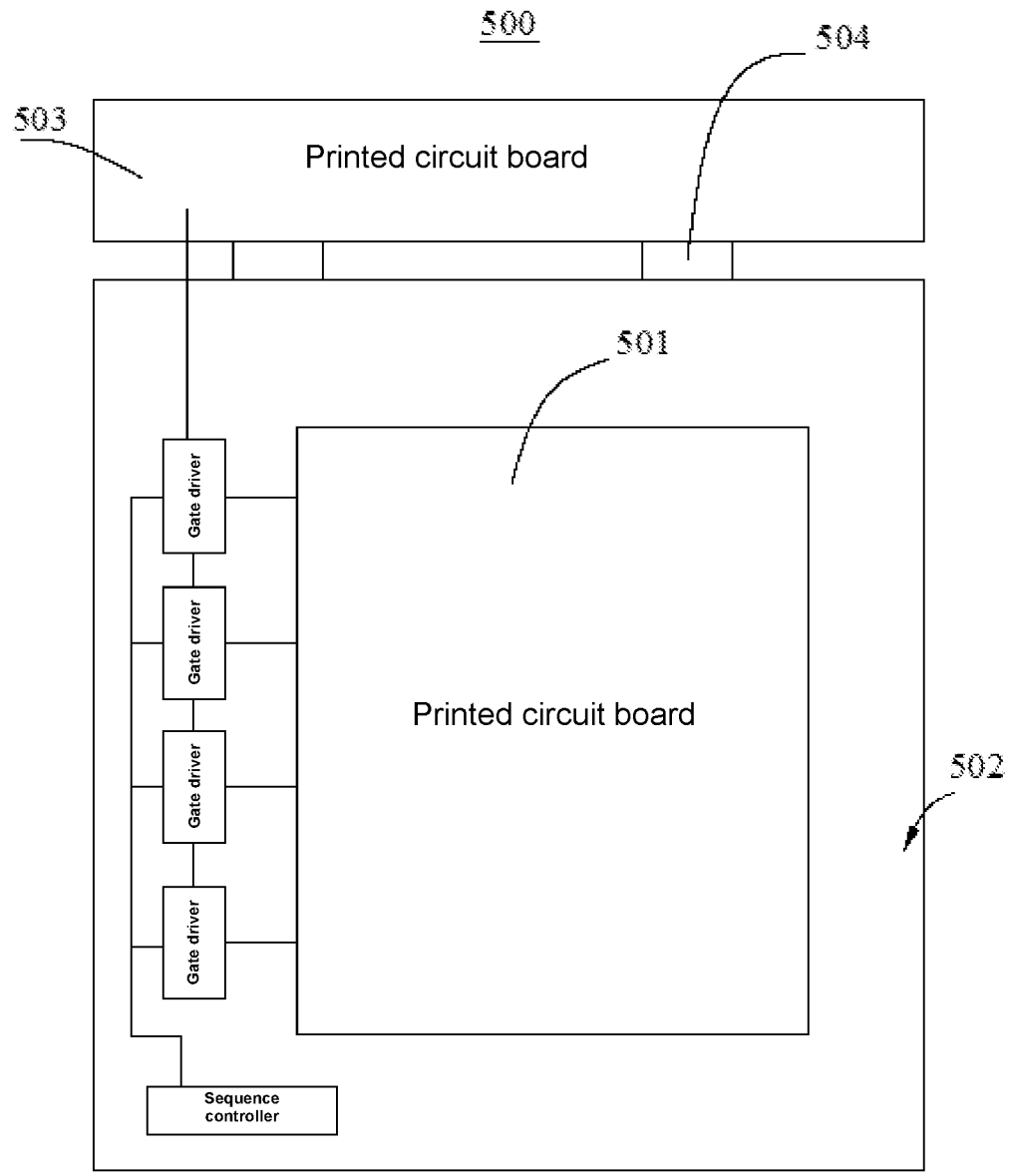
FIG. 3 is a structure diagram of a liquid crystal display provided by the embodiment of the present invention.

Please refer to FIG. 3. FIG. 3 is a structure diagram of a liquid crystal display provided by the embodiment of the present invention. The present invention further provides a liquid crystal display 500, comprising a liquid crystal panel 501, an array substrate 502 and a printed circuit board 503. The array substrate 502 is an array substrate of any of the aforesaid embodiments. The printed circuit board 503 is employed to provide the first voltage and the second voltage to the array substrate 502. The printed circuit board 503 is coupled to the array substrate 502 by being coupled to the circuit 504. The array substrate 502 is coupled to the liquid crystal panel 501 to drive the liquid crystal panel 501 to show an image.

Figure 4:
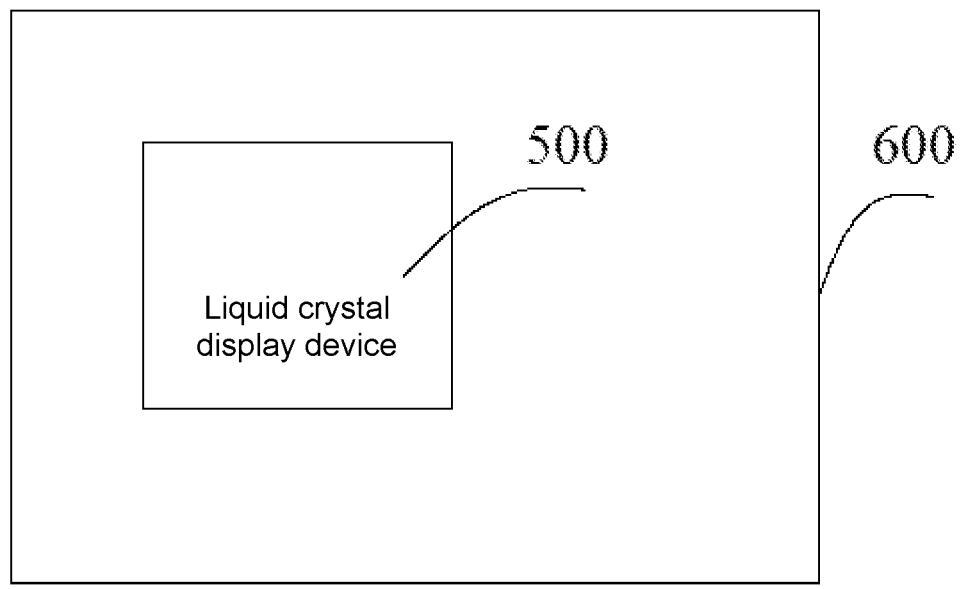
FIG. 4 is a block diagram of a display device provided by the embodiment of the present invention.

Please refer to FIG. 4. FIG. 4 is a block diagram of a display device provided by the embodiment of the present invention. The present invention further provides a display device 600 comprising the aforesaid liquid crystal display 500. It can be understood that the display device 600 can be the cell phone, the tablet, the television, the display, the notebook, the digital camera, the navigator or any electronic device with display function but not limited thereto.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. An array substrate, comprising a sequence controller and a plurality of gate drivers, wherein each of the gate drivers comprises a first adjustable resistor and a gate drive unit, and one end of the first adjustable resistor is coupled to a first voltage, and the other end of the first adjustable resistor is coupled to a first input end of the gate drive unit, and the sequence controller is coupled to a control end of the first adjustable resistor to adjust a resistance value of the first adjustable resistor to make voltage difference values among the plurality of gate drive units in a preset range;

wherein the plurality of gate drivers comprises at least an anterior gate driver and a posterior gate driver that are connected in series, wherein the gate drive unit of the posterior gate driver is connected through the first adjustable resistor thereof to the gate drive unit of the anterior gate driver.

2. The array substrate according to claim 1, wherein the gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

3. The array substrate according to claim 2, wherein the first voltage is a negative voltage, and the second voltage is a positive voltage, and an absolute value of the second voltage is larger than an absolute value of the first voltage.

4. The array substrate according to claim 1, wherein the first voltage is a negative voltage.

5. The array substrate according to claim 1, wherein the first voltage is a positive voltage.

6. The array substrate according to claim 1, wherein the sequence controller controls the resistance value of the first adjustable resistor in each of the gate drivers to be different, and the resistance value of the first adjustable resistor decreases along a potential drop direction of the first voltage.

7. A liquid crystal display, comprising a liquid crystal panel and an array substrate, wherein the array substrate comprises a sequence controller and a plurality of gate drivers, and each of the gate drivers comprises a first adjustable resistor and a gate drive unit, and one end of the first adjustable resistor is coupled to a first voltage, and the other end of the first adjustable resistor is coupled to a first input end of the gate drive unit, and the sequence controller is coupled to a control end of the first adjustable resistor to adjust a resistance value of the first adjustable resistor to make voltage difference values among the plurality of gate drive units in a preset range, and the gate drive units are coupled to the liquid crystal panel to drive the liquid crystal panel to show an image;
   wherein the plurality of gate drivers comprises at least an anterior gate driver and a posterior gate driver that are connected in series, wherein the gate drive unit of the posterior gate driver is connected through the first adjustable resistor thereof to the gate drive unit of the anterior gate driver.

8. The liquid crystal display according to claim 7, wherein the liquid crystal display further comprises a print circuit board, which is employed to output the first voltage to the plurality of gate drivers.

9. The liquid crystal display according to claim 7, wherein the gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

10. The liquid crystal display according to claim 9, wherein the first voltage is a negative voltage, and the second voltage is a positive voltage, and an absolute value of the second voltage is larger than an absolute value of the first voltage.

11. The liquid crystal display according to claim 7, wherein the first voltage is a negative voltage.

12. The liquid crystal display according to claim 7, wherein the first voltage is a positive voltage.

13. The liquid crystal display according to claim 7, wherein the sequence controller controls the resistance value of the first adjustable resistor in each of the gate drivers to be different, and the resistance value of the first adjustable resistor decreases along a potential drop direction of the first voltage.

14. A display device, comprising a liquid crystal display, and the liquid crystal display comprises a liquid crystal panel and an array substrate, and the array substrate comprises a sequence controller and a plurality of gate drivers, and each of the gate drivers comprises a first adjustable resistor and a gate drive unit, and one end of the first adjustable resistor is coupled to a first voltage, and the other end of the first adjustable resistor is coupled to a first input end of the gate drive unit, and the sequence controller is coupled to a control end of the first adjustable resistor to adjust a resistance value of the first adjustable resistor to make voltage difference values among the plurality of gate drive units in a preset range, and the gate drive units are coupled to the liquid crystal panel to drive the liquid crystal panel to show an image;
   wherein the plurality of gate drivers comprises at least an anterior gate driver and a posterior gate driver that are connected in series, wherein the gate drive unit of the posterior gate driver is connected through the first adjustable resistor thereof to the gate drive unit of the anterior gate driver.

15. The display device according to claim 14, wherein the liquid crystal display further comprises a print circuit board, which is employed to output the first voltage to the plurality of gate drivers.

16. The display device according to claim 14, wherein the gate driver further comprises a second adjustable resistor, and the gate drive unit comprises a second input end, and one end of the second adjustable resistor is coupled to a second voltage, wherein a polarity of the second voltage is opposite to a polarity of the first voltage, and the other end of the second adjustable resistor is coupled to the second input end, and the sequence controller is coupled to a control end of the second adjustable resistor to adjust a resistance value of the second adjustable resistor to make voltage difference values among the plurality of gate drive units in the preset range.

17. The display device according to claim 16, wherein the first voltage is a negative voltage, and the second voltage is a positive voltage, and an absolute value of the second voltage is larger than an absolute value of the first voltage.

18. The display device according to claim 14, wherein the first voltage is a negative voltage.

19. The display device according to claim 14, wherein the first voltage is a positive voltage.

20. The display device according to claim 14, wherein the sequence controller controls the resistance value of the first adjustable resistor in each of the gate drivers to be different, and the resistance value of the first adjustable resistor decreases along a potential drop direction of the first voltage.

* * * * *